United States Patent [19]

Arikawa

[11] 3,861,756
[45] Jan. 21, 1975

[54] ANTI-SKID SYSTEM FOR VEHICLES
[75] Inventor: Tetsuro Arikawa, Yokosuka, Japan
[73] Assignee: Nippon Air Brake Company Ltd., Kobe, Japan
[22] Filed: Aug. 20, 1973
[21] Appl. No.: 390,096

[30] Foreign Application Priority Data
Aug. 31, 1972 Japan.................................. 47-87417

[52] U.S. Cl................................ 303/21 BE, 303/20
[51] Int. Cl............................................... B60t 8/12
[58] Field of Search ................ 188/181; 303/20, 21; 307/10 R; 317/5; 324/161–162; 340/53, 262, 263

[56] References Cited
UNITED STATES PATENTS

| | | | |
|---|---|---|---|
| 3,525,553 | 8/1970 | Carp et al. | 303/20 X |
| 3,578,819 | 5/1971 | Atkins | 303/21 BE |
| 3,704,043 | 11/1972 | Hickner et al. | 303/20 X |
| 3,744,851 | 7/1973 | Burckhardt et al. | 303/21 BE |
| 3,764,817 | 10/1973 | Nakamura et al. | 303/20 X |
| 3,782,783 | 1/1974 | Jones | 303/21 P |

Primary Examiner—Trygve M. Blix
Assistant Examiner—Stephen G. Kunin
Attorney, Agent, or Firm—Bosworth, Sessions & McCoy

[57] ABSTRACT

An anti-skid system for vehicles comprising a wheel speed detector, a generator for generating an approximate vehicle body speed pattern when the wheel deceleration attains a first reference setting, a first comparator for comparing the wheel speed with the approximate vehicle body speed pattern, a differentiator for differentiatng the wheel speed, a second comparator for comparing the differentiator output with a second reference setting, a third comparator for comparing the differentiator output with a third reference setting, apparatus for changing over the level of the first, second and third reference settings depending on the road surface condition, and two solenoid operated valves whose solenoids are electrically connected to the comparators through AND gates for controlling the brake fluid pressure applied to the wheel cylinders.

4 Claims, 7 Drawing Figures

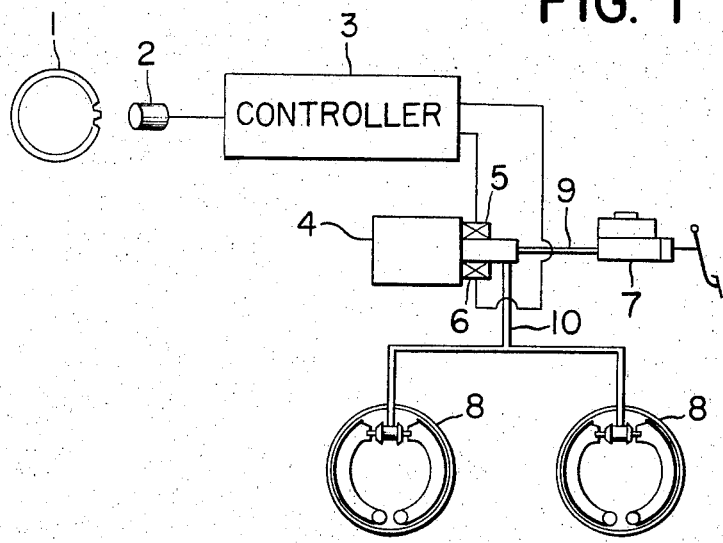
FIG. 1
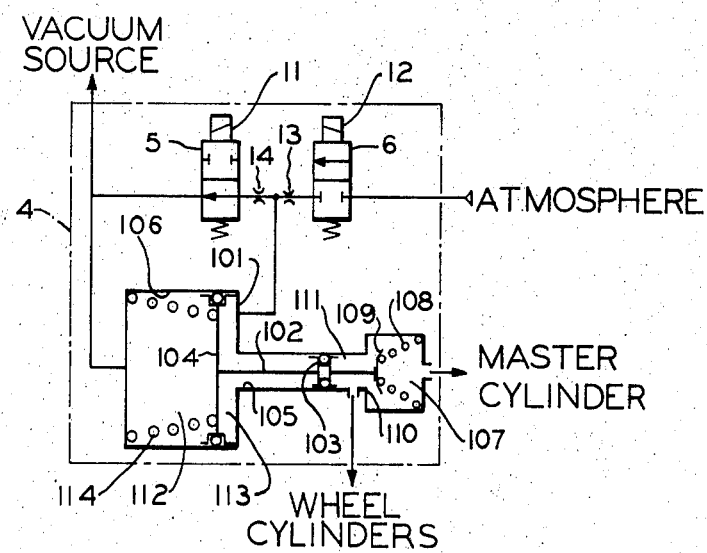
FIG. 2
FIG. 3
|  | 5(11) | 6(12) |
|---|---|---|
| RELIEVE | ON | ON |
| MAINTAIN | ON | OFF |
| INCREASE | OFF | OFF |

ANTI-SKID SYSTEM FOR VEHICLES

BACKGROUND OF THE INVENTION

This invention relates to improvements in anti-skid systems for vehicles.

In a conventional anti-skid system for vehicles, especially automotive vehicles, means are provided for preventing undesirable skidding of the wheels which occurs when the vehicle brake is applied abruptly during running on the usual road surface having a high coefficient of friction (hereinafter referred to as a high friction road surface) or when the brake is applied during running on an unusual road surface having a low coefficient of friction (hereinafter referred to as a low friction road surface). Such means control the rotational speed of the wheels so as to provide the optimum force of friction between the wheels and the road surface, thereby reducing the stopping distance and preventing irregular gyration of the vehicle body due to skidding of the wheels. In a conventional anti-skid system, wheel deceleration is detected and compared with a predetermined reference setting so as to relieve the braking force when the former value exceeds the latter and to reapply the braking force when the former value is restored to the level of the latter. This relief and application of the braking force is repeated to attain the desired anti-skid effect. The conventional anti-skid system which operates in this manner has a disadvantage in that the transition between relief and application of the braking force occurs abruptly thereby imparting a great shock to the wheel structure. Such abrupt transitions in condition also result in an uncomfortable ride.

SUMMARY OF THE INVENTION

With a view to obviating the above defects, it is a primary object of the present invention to provide an improved anti-skid system for vehicles which prevents excessive relieving and application of the braking force and attains a smoother and stabler anti-skid control. More precisely, the present invention provides improvements in the anti-skid system disclosed in copending U.S. Pat. application Ser. No. 329,353 filed Feb. 5, 1973. According to the present invention, instructions for maintaining the braking force of a constant magnitude are provided in addition to the braking force relieving instructions and braking force increasing instructions. These instructions are derived from the combination of two on-off signals so as to control the braking force by the repetition of these instructions. The braking force is controlled by controlling the brake fluid pressure which is increased, decreased or maintained by increasing, decreasing or maintaining the volume of brake fluid by a brake fluid pressure control means (hereinafter referred to as a modulator) in response to the braking force relieving, increasing or maintaining instructions. These instructions are generated by an electronic control means (hereinafter referred to as a controller). The controller makes the necessary computations for determining the appearance of these instructions and their duration.

According to the present invention, the rotational speed of the wheels is detected by a sensor and an approximate vehicle body speed and wheel acceleration (including deceleration) are computed by the controller so that, when these values satisfy several conditions independently or simultaneously, one of the braking force relieving, increasing and maintaining signals is selectively generated. Generation of these three signals is then repeated in a sequence for controlling the braking force. Further, vehicle body deceleration is detected to determine whether the vehicle is driving on a high friction road surface or a low friction road surface and in response to that determination a plurality of reference settings are selected.

Describing the invention in more detail, the sensor connected to the controller in the anti-skid system generates an A.C. voltage having a frequency proportional to the rotational speed of the wheel, and an A.C.-D.C. converter in the controller continuously connects the A.C. voltage to a D.C. voltage. This D.C. voltage has a level proportional to the rotational speed of the wheel $r\omega$ where $r$ is the radius of the wheel and $\omega$ is its angular velocity. When the rate of change (negative) of the wheel speed relative to time, that is, wheel deceleration reaches the level of a first predetermined reference setting $-\alpha p$ due to the application of the brake, a signal representative of an approximate vehicle body speed E whose deceleration is predetermined is generated along with a first control signal. This first control signal disappears when the wheel speed again exceeds the level of the approximate vehicle body speed E due to the maintenance or reduction of the brake fluid pressure in a manner described below. Further, the D.C. voltage proportional to the wheel speed $r\omega$ is applied to a differentiator. The output of the differentiator is a voltage proportional to the wheel acceleration $r\dot{\omega}$. A second control signal is generated when the voltage proportional to the wheel deceleration $-r\dot{\omega}$ exceeds a second predetermined reference setting $-G_o$ ($G_o<O$).

A third control signal is generated when the voltage proportional to the wheel acceleration $r\dot{\omega}$ is less than a third predetermined reference setting G. This third control signal disappears when the wheel speed is restored and the voltage proportional to the wheel acceleration $r\dot{\omega}$ exceeds the level of the third predetermined reference setting G due to the maintenance or reduction of the brake fluid pressure in a manner described below. The arrangement is such that the brake fluid pressure is relieved when all of the first, second and third signals appear simultaneously, the brake fluid pressure is maintained when the second signal only among these three signals disappears, and the brake fluid pressure is increased in every other possible combination of these three signals.

Further, a vehicle body deceleration detector is provided so as to detect whether the vehicle body deceleration exceeds the level of a fourth predetermined reference setting $-\dot{V}_o$, that is, whether the brake is applied during running of the vehicle on a high friction road surface or a low friction road surface. In response to this determination the level of the first, second and third reference settings is set to the appropriate one of two levels. When the vehicle is running on a low friction road surface, the first and second reference settings $-\alpha p$ and $-G_o$ are set to a lower level than for a high friction road surface, while the third reference setting G is set to a higher level so as to provide the most suitable control for all road surface conditions.

Other objects, features, and advantages of the present invention will be apparent from the following detailed description taken in conjunction with the accompanying drawings.

BRIEF DESCRIPTION OF THE DRAWINGS

FIG. 1 is a diagrammatic view showing schematically the structure of an anti-skid system for a vehicle according to the present invention;

FIG. 2 is a schematic diagram of a vacuum circuit associated with solenoid operated valves in the vacuum actuated brake fluid pressure control means or modulator shown in FIG. 1;

FIG. 3 is a table showing the manner of relieving, maintaining and increasing the braking force by selective energization and deenergization of the solenoids of the solenoid operated valves in the circuit shown in FIG. 2;

DESCRIPTION OF THE PREFERRED EMBODIMENT

Figure 4:
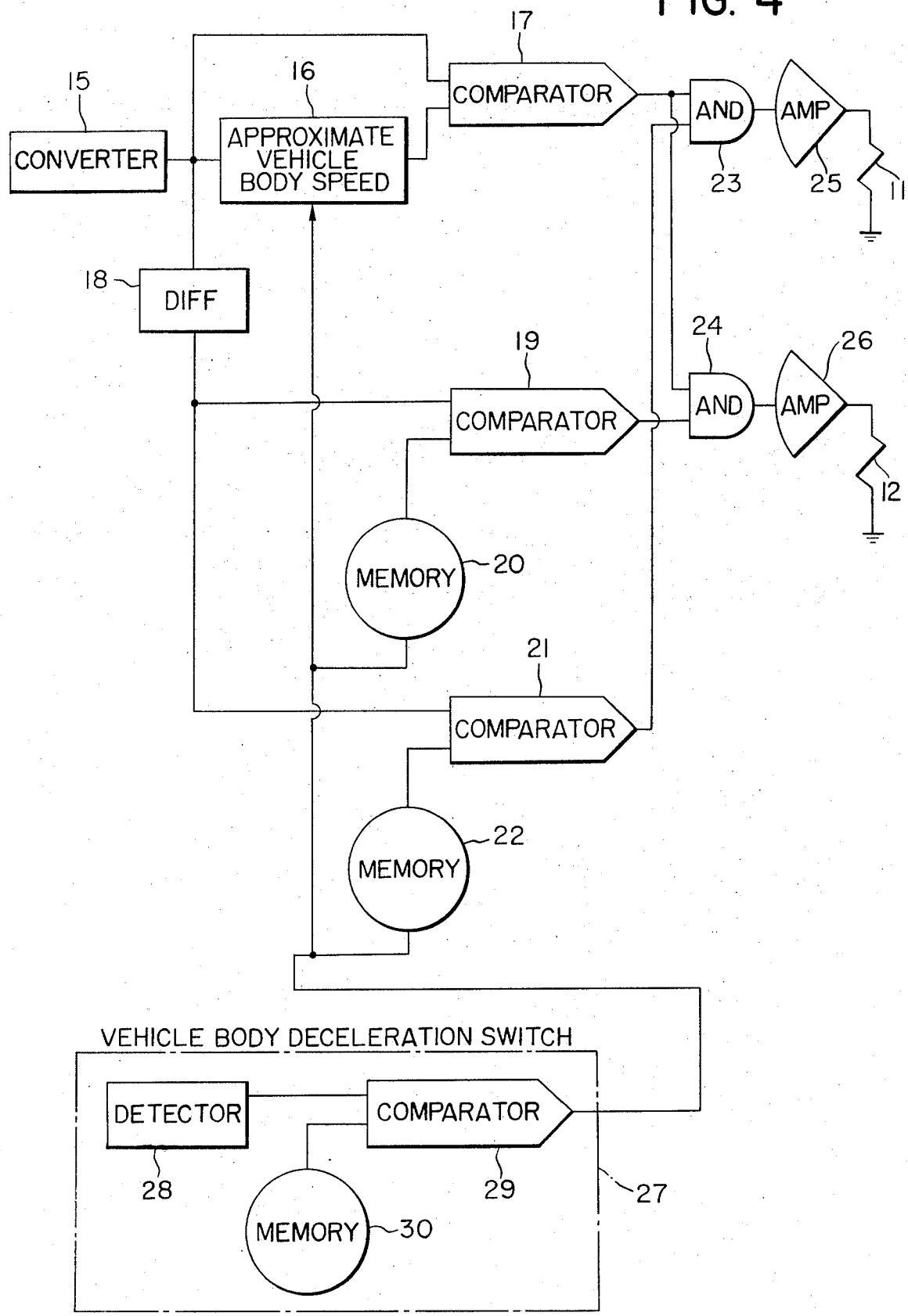
FIG. 4 is a block diagram showing the structure of one form of controller employed in the anti-skid system according to the present invention.

Referring to FIG. 1, a gear 1 is mounted on the axle or propeller shaft of a vehicle for rotation in unitary relation with the wheels. A sensor 2 is operatively associated with the gear 1 for generating an A.C. voltage having a frequency proportional to the wheel speed as the gear 1 is rotated relative to the sensor 2. A controller 3 is electrically connected to the sensor 2 so that the latter applies its A.C. output to the former. The controller 3 generates a plurality of signals for controlling the wheel speed. A modulator 4 is actuated by a vacuum produced in the engine intake manifold (not shown) or by compressed air supplied from an air compressor (not shown). Depending on the combination of signals applied from the controller 3, solenoid operated valves 5 and 6 in the modulator 4 are energized or deenergized to decrease, maintain or increase the brake fluid pressure in wheel cylinders of wheel brake units 8 thereby relieving, maintaining or increasing the braking force. When the anti-skid system is not in operation, that is, in a generally lightly braked condition, the brake fluid pressure in master cylinder 7 is not controlled in any way by the modulator 4 and is supplied by way of conduits 9 and 10 into the wheel cylinders of the wheel brake units 8 to apply the brake action to the vehicle in the usual manner. However, when the brake is applied abruptly on a high friction road surface or is applied on a low friction road surface such as a snow-laden or frozen road surface, a brake fluid pressure relieving signal appears at first from the controller 3 so that the modulator 4 acts to relieve the brake fluid pressure. Thereafter, brake fluid pressure maintaining, increasing and relieving signals are generated repeatedly to control the brake fluid pressure, hence the braking force, thereby maintaining the optimum frictional force between the wheels and the road surface.

Referring to FIG. 2, the solenoid operated valves 5 and 6 incorporated in the modulator 4 have respective solenoids 11 and 12. The solenoid operated valves 5 and 6 are two-port valves, the valve 5 being normally open and the valve 6 being normally closed. The inlet ports of the valves 5 and 6 are connected to a vacuum source and atmosphere, respectively, and the outlet ports thereof are connected to a vacuum chamber in the cylinder body 101. A plunger 102 in the cylinder body has two pistons 103 and 104 which are slidable within cylinders 105 and 106, respectively. In a valve chamber 107 located at the right end of the cylinder body 101, there is provided a valve 109 which is biased by a spring 108. Valve 109 can be opened by force transmitted by the right end of the plunger 102 as shown in FIG. 2. A chamber 111 formed between the piston 103 and a valve seat 110 communicates with the wheel cylinders of the vehicle and valve chamber 107 communicates with the master cylinder. The cylinder 106 is divided into two chambers 112 and 113 by the piston 104, the left chamber 112 being connected to a vacuum source and the right chamber 113 being connected to output ports of the solenoid operated valves 5 and 6. The plunger 102 is biased to the right by a spring 114 which is stronger than the forces of the spring 108 and the braking fluid pressure.

The function of the modulator 4 will now be explained.

In normal operation, valves 5 and 6 are in a deenergized state, open and closed, respectively, as shown in FIG. 2. In this state, chamber 113 of cylinder body 101 is connected to the vacuum source and the plunger 102 is urged rightwards by the force of the spring 114 to open the valve 109, thereby establishing a path for braking fluid between the master cylinder and the wheel cylinders.

If the solenoids 11 and 12 are concurrently energized during the braking operation, the valve 5 will be closed and the valve 6 will be opened. Atmospheric air is introduced into the chamber 113 through the orifice 13 which determines the flow rate of the air. The plunger 102 is then moved leftwards against the force of the spring 114 and closes the valve 109 to block communication between the master cylinder and the wheel cylinders. At the same time, the volume of chamber 111 increases, thereby decreasing the brake pressure. When solenoid 12 is deenergized in the course of this brake pressure decrease, valve 6 is closed and the flow of air into chamber 113 ceases. Thus, movement of the plunger is stopped so as to maintain the brake pressure. Thereafter, solenoid 11 is also deenergized and the valve 5 is opened. The pressure in the chamber 113 is then relieved by the vacuum source at a speed determined by the orifice 14. The plunger 102 moves rightwards and decreases the volume of chamber 111, thereby increasing the brake pressure.

Since variations in operating conditions are independent of the order of actuation of the above-mentioned elements, other than the operation of valve 109, there may, of course, be various sequences of actuation according to actual braking conditions.

The brake fluid pressure is relieved, maintained and increased by the selective energization (on) and deenergization (off) of the solenoid operated valves 5 and 6 in a manner shown in the Table of FIG. 3.

Referring to FIG. 4, an A.C. voltage proportional to the wheel speed $r\omega$ is generated by the sensor 2 in FIG. 1 and is applied to a converter 15 to be converted into a D.C. voltage proportional to the wheel speed $r\omega$. Thus, the output of the converter 15 represents the wheel speed $r\omega$. This output is applied to an approximate vehicle body speed signal generator 16 which is composed of a capacitor and a constant-current discharge circuit. When the rate of change (negative) of the wheel speed $r\omega$ relative to time, that is, wheel deceleration reaches the level of a first predetermined reference setting $-\alpha p$, the generator 16 generates a signal representative of an approximate vehicle body speed E whose deceleration is predetermined. A first comparator 17 compares the input representative of the approximate vehicle body speed E with the input representative of the wheel speed $r\omega$. When the former input is larger than the latter input, an output or "1" appears from the first comparator 17, while the former input is smaller than the latter input, no output or "0" appears from the comparator 17. The output of the converter 15 is also applied to a differentiator 18 which is in the form of an RC circuit. The differentiator 18 differentiates the input representative of the wheel speed $r\omega$ and generates a signal representative of the wheel acceleration $r\dot{\omega}$. A second comparator 19 compares the input representative of the wheel acceleration $r\dot{\omega}$ with a second predetermined reference setting $-G_o$ ($G_o<0$) stored in a memory 20. An output or "1" appears from the second comparator 19 when the input representative of the wheel deceleration $-r\dot{\omega}$ is larger than the second reference setting $-G_o$. A third comparator 21 compares the input representative of the wheel acceleration $r\dot{\omega}$ with a third predetermined reference setting G stored in a memory 22. An output or "1" appears from the third comparator 21 when the input representative of the wheel acceleration $r\dot{\omega}$ is smaller than the third reference setting G, while no output or "0" appears from the comparator 21 when the former is larger than the latter. The first and third comparators 17 and 21 are connected to a first AND gate 23 so that an output appears from the AND gate when the two inputs are applied simultaneously from these comparators 17 and 21. The first and second comparators 17 and 19 are connected to a second AND gate 24 so that an output appears from the AND gate when the two inputs are applied simultaneously from these comparators 17 and 19. The AND gates 23 and 24 are connected through amplifiers 25 and 26 to the solenoids 11 and 12 of the solenoid operated valves 5 and 6 (FIG. 2), respectively, so as to energize these solenoids.

A vehicle body speed deceleration switch 17 comprises a detector 28 for detecting the vehicle body deceleration $-\dot{V}$, a fourth comparator 29 and a memory 30 storing a fourth predetermined reference setting $-\dot{V}_o$ ($-\dot{V}_o<0$). The operation of the vehicle body deceleration switch 27 is such that an output or "1" appears therefrom when the vehicle body deceleration $-\dot{V}$ is larger than the fourth reference setting $-\dot{V}_o$. Practically, the vehicle body deceleration switch 17 has a construction such that one of two conductive rods is always immersed in a conductive fluid such as mercury contained in one leg of a U-tube and the other conductive rod is fixed with its lower end disposed at a level higher than the surface level of the fluid in the other leg of the U-tube. This U-tube is secured in the advancing direction of the vehicle so that these two conductive rods act as a switch when the vehicle body deceleration attains a predetermined value and more than a predetermined difference is produced between the surface levels of the fluid in the two tube portions. Of course, an orifice must be disposed at a suitable place within the U-tube so as to avoid malfunctioning of the switch due to vibrations of the vehicle body caused by various kinds of disturbances. When the brake is applied abruptly during running of the vehicle on a high friction road surface, the vehicle body deceleration switch 27 generates an output which is applied to the approximate vehicle body speed signal generator 16 and memories 20 and 22 for changing the first reference setting $-p$ and second reference setting $-G_o$ to the higher of two levels and changing the third reference setting G to the lower of two levels.

Figure 5:
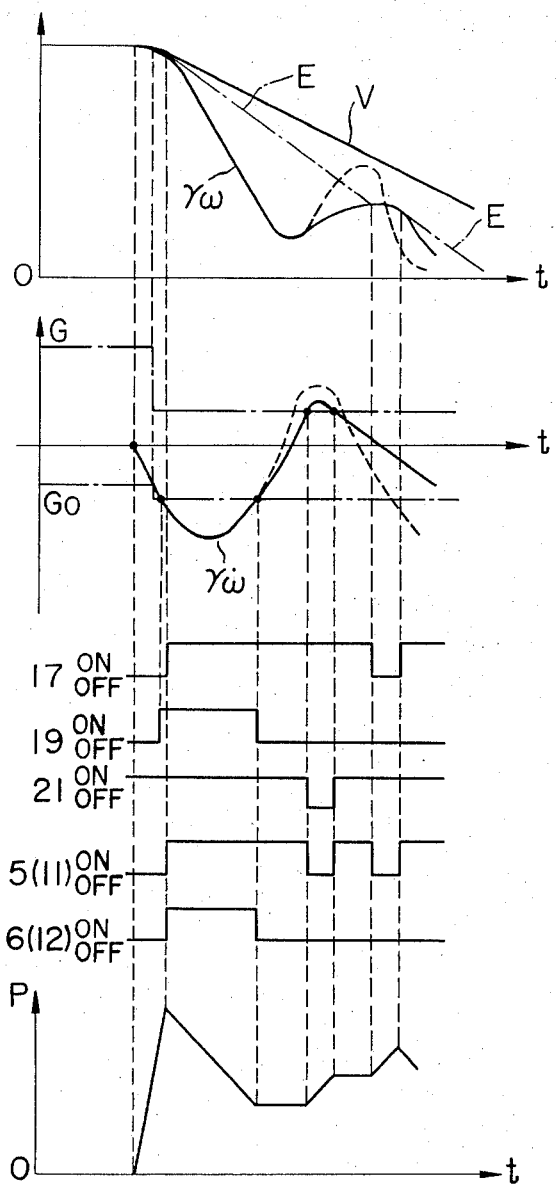
FIG. 5 is a graphic illustration of the operation of the anti-skid system during running of the vehicle on a high friction road surface.

FIG. 5 is a graphic illustration of the operation of the anti-skid system of the present invention when the vehicle is running on a high friction road surface. In response to the application of the brake in a condition which will cause the operation of the anti-skid system, the speed of the vehicle body varies in a manner shown by the curve V in FIG. 5. The wheel speed $r\omega$ is also reduced. The vehicle body deceleration switch 27 determines the road surface condition and causes the proper setting of the first, second and third reference settings as described above. When the rate of change (negative) relative to time of the converter output representative of the wheel speed $r\omega$ attains the level of the first reference setting $-\alpha p$, the approximate vehicle body speed signal generator 16 generates an output representative of the approximate vehicle body speed E, and an output or "1" appears from the first comparator 17. At this time, the wheel deceleration $-r\dot{\omega}$ has increased to exceed the second reference setting $-G_o$, and an output or "1" appears from each of the second and third comparators 19 and 21 since the conditions $-r\dot{\omega}>-G_o$ and $r\dot{\omega}<G$ are satisfied. Therefore, both AND gates 23 and 24 generate outputs to energize the solenoids 11 and 12 of the solenoid operated valves 5 and 6, respectively, thereby relieving the brake fluid pressure P as indicated in FIG. 3.

When the wheel deceleration $-r\dot{\omega}$ decreases to a value less than the second reference setting $-G_o$ due to the relief of the brake fluid pressure P, the output of the second comparator 19 disappears and the AND gate 24 is turned off to deenergize the solenoid 12, thereby maintaining the brake fluid pressure P as indicated in FIG. 3. When the wheel speed $r\omega$ is restored and the wheel acceleration $r\dot{\omega}$ exceeds the third reference setting G, the output from the third comparator 21 disappears and the AND gate 23 is turned off to deenergize the solenoid 11, thereby increasing the brake fluid pressure P as indicated in FIG. 3. (This avoids any tendency toward an increase in the braking distance on a high friction road surface.)

With the reduction in the rate of restoration of the wheel speed $r\omega$, the wheel acceleration $r\dot{\omega}$ decreases to a value smaller than the third reference setting G, and an output appears from the third comparator 21 to again turn on the AND gate 23 thereby energizing solenoid 11. Since solenoid 12 remains deenergized, the brake fluid pressure P is maintained as indicated in FIG. 3. When the wheel speed $r\omega$ is restored to correspond to the approximate vehicle body speed E, the output from the first comparator 17 disappears and both AND gates 23 and 24 are turned off. The solenoids 11 and 12 of the solenoid operated valves 5 and 6 are deenergized and the brake fluid pressure P is again increased to increase the braking force. Thereafter, the brake fluid pressure relieving, maintaining and increasing actions are repeated to control the brake fluid pressure P and maintain the optimum slip ratio.

Figure 6:
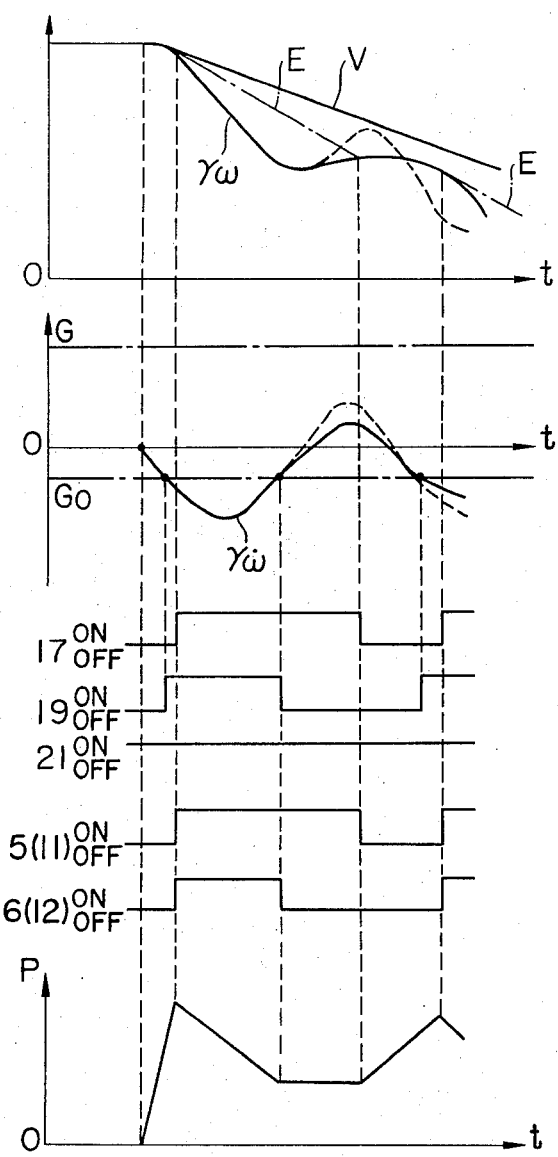
FIG. 6 is a graphic illustration of the operation of the anti-skid system during running of the vehicle on a low friction road surface.

FIG. 6 is a graphic illustration of the operation of the anti-skid system when the vehicle is running on a low friction road surface. The operation of the anti-skid system is substantially similar to that shown in FIG. 5. However, since the first and second reference settings $-\alpha p$ and $-G_o$ are set at their lower levels and the third reference setting G is set at its higher level, the output of the third comparator 21 appears for longer periods than in the case of FIG. 5. Thus, although the brake fluid pressure "relieving → maintaining → increasing" cycles are repeated as in the case of FIG. 5, the brake fluid pressure maintaining and increasing periods in the cycles occur only once and are sustained over a longer period of time. Further, the first and second reference settings $-\alpha p$ and $-G_o$ are set at their lower levels to avoid an undesirable increase in the wheel deceleration during running of the vehicle on a low friction road surface thereby preventing a tendency to skid on such road surface.

In the manner described above, the anti-skid system operates effectively during running of the vehicle on various road surfaces including a high and a low friction road surface.

The dotted curves shown in FIGS. 5 and 6 represent the wheel speed $r\omega$ and wheel acceleration $\dot{r\omega}$ obtained with the anti-skid system disclosed in copending application Ser. No. 329,353 mentioned above. It will be seen that the wheel speed $r\omega$ in the earlier invention is restored at a faster rate and to a higher value than in the present invention. It will thus be understood that the present invention provides further improvements in the control of the optimum slip ratio attained by the earlier invention and the variations can be smoother and not as great around the optimum slip ratio.

Figure 7:
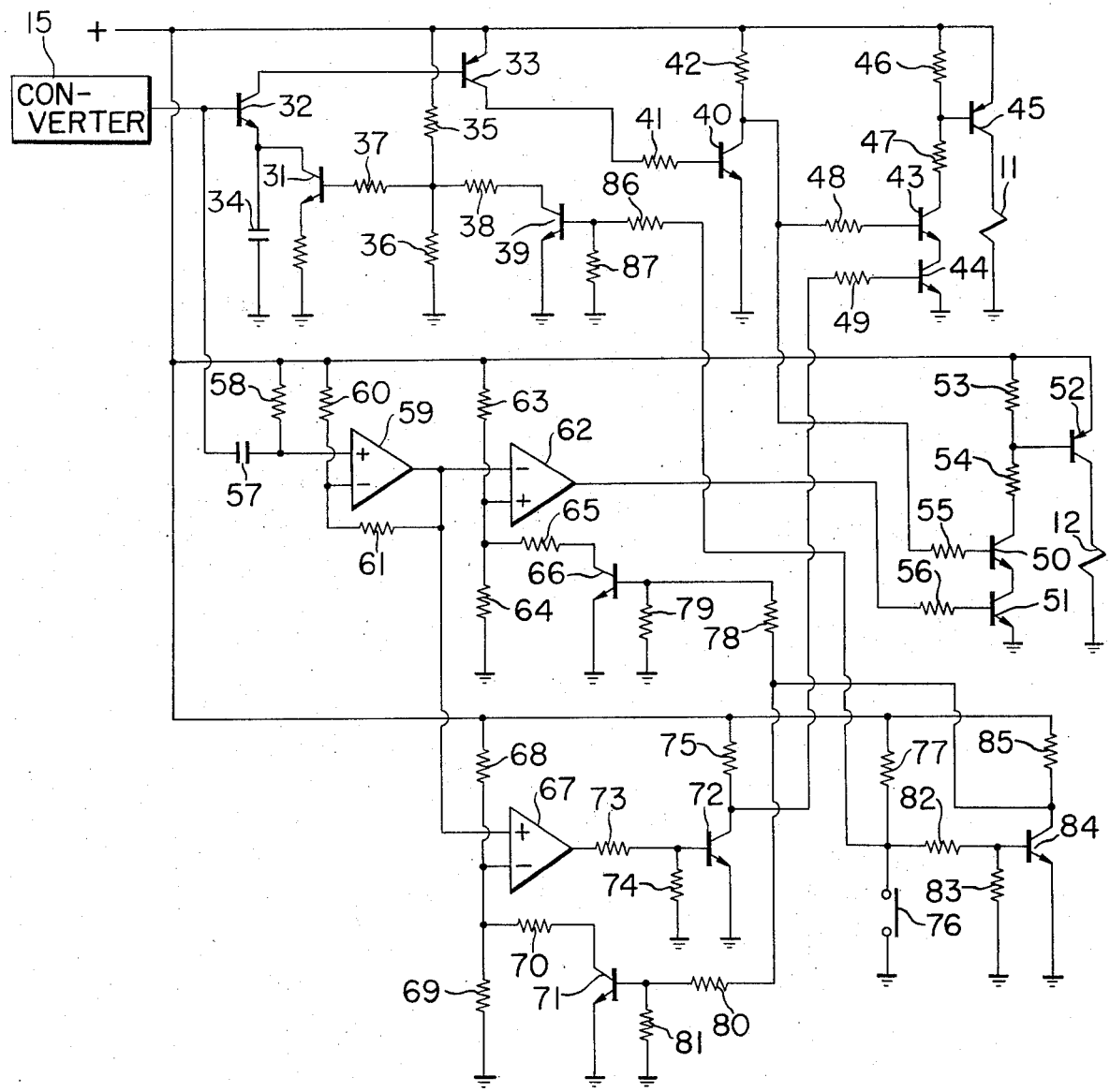
FIG. 7 is an electrical circuit diagram of the controller employed in the anti-skid system according to the present invention.

FIG. 7 is a circuit diagram of the controller 3 in the anti-skid system of the present invention. Referring to FIG. 7, the converter 15 generates an output representative of the wheel speed $r\omega$. This output is applied to the base of a transistor 32. In the steady running condition, a constant current flows through the collector and emitter of a transistor 31 for reasons described below and a corresponding current flows through the emitter and base of a transistor 33. A capacitor 34 in the emitter circuit of transistor 32 is charged and the voltage thereacross, hence the emitter potential of transistor 32, is substantially equal to the base potential of the transistor 32 and, therefore, to the voltage representative of the wheel speed $r\omega$. The collector current of transistor 31 is substantially constant since the base potential is maintained substantially constant by the resistances of transistors 31 and 39. A switch 76 is turned on and off in interlocking relation with the vehicle body deceleration switch 27 (shown in FIG. 4) for turning on and off transistor 39 thereby changing the constant current value of the transistor 31. This constant current value represents the first reference setting $-\alpha p$.

When the wheel speed $r\omega$ is reduced in the steady running condition of the vehicle as a result of the brake being applied the anti-skid system goes into operation and the potential of capacitor 34 is reduced. With a further reduction in the wheel speed $r\omega$, the collector current of transistor 31 is supplied entirely from capacitor 34. The capacitor 34 discharges with a constant current and its potential is reduced at a constant rate. Thus, the emitter voltage of transistor 32 represents the approximate vehicle body speed E. With the reduction of the wheel speed $r\omega$, transistor 32 is cut off resulting in the cut-off of transistor 33. An output is thereby produced from an inverter consisting of transistor 40 and resistors 41 and 42 which is applied to one input of a first AND circuit consisting of transistors 43, 44 and resistors 46, 47, 48, 49 and to one input of a second AND circuit consisting of transistors 50, 51 and resistors 53, 54, 55, 56. Thus, in response to the cut-off of transistor 32, transistor 40 is cut off and turns on transistors 43 and 50. This corresponds to the operation of the first comparator 17.

In the meantime, the input representative of the wheel speed $r\omega$ is applied to a differentiation circuit consisting of capacitor 57 and resistor 58 and an output voltage representative of the wheel acceleration $\dot{r\omega}$ appears across the resistor 58. This output voltage is amplified by a circuit consisting of an amplifier 59 and resistors 60 and 61 to produce an output voltage which represents the practical wheel acceleration $\dot{r\omega}$. This voltage is compared in a comparator (amplifier) 62 with a reference voltage (the second reference setting $-G_o$) which is determined by resistors 63, 64 and 65 and the conduction state of transistor 66. When the input representative of the wheel deceleration $-\dot{r\omega}$ is larger than the second reference setting $-G_o$, an output of "1" level appears from the comparator 62. This corresponds to the operation of the second comparator 19 shown in FIG. 4. The output of the comparator 62 is applied to the transistor 51 in the second AND circuit.

In the meantime, the output voltage of amplifier 59 representative of the wheel acceleration $\dot{R\omega}$ is compared in a comparator (amplifier) 67 with a reference voltage (the third reference setting G) which is determined by resistors 68, 69 and 70 and the conduction state of transistor 71. When the input representative of the wheel acceleration $\dot{r\omega}$ is larger than the third reference setting G, an output of "1" level appears from the comparator 67. This output is inverted by an inverter consisting of transistor 72 and resistors 73, 74 and 75 to obtain a signal of "0" level or ground potential, thereby cutting off the transistor 44 in the first AND circuit. In other words, the collector voltage of the transistor 72 has a "1" level when the output of amplifier 59 representative of the wheel acceleration $\dot{r\omega}$ is smaller than the third reference setting G. This corresponds to the operation of the third comparator 21 shown in FIG. 4. The collector output of transistor 72 is applied to the transistor 44 in the first AND circuit. Since the two transistors in the AND circuits are connected in series, outputs appear from these AND circuits in response to the application of two inputs of "1" level and are applied through transistor amplifiers 45 and 52 to solenoids 11 and 12 for energizing same. These solenoids are the same as those shown in FIG. 4.

The switch 76 is arranged to be opened and closed in interlocking relation with the vehicle body deceleration switch 27 shown in FIG. 4. In the steady running condition, the switch 76 is maintained in the open position. Switch 76 is urged to the closed position only when the brake is applied to initiate the operation of the anti-skid system during running of the vehicle on a high friction road surface. More precisely, switch 76 is urged to the closed position when the vehicle body deceleration $-\dot{V}$ exceeds the fourth reference setting $-\dot{V}_o$ as described with reference to FIGS. 4 and 5. In the operation of the system on a high friction road surface, therefore, the switch 76 is closed to bypass the current flowing through resistors 82, 83, 86 and 87 thereby cutting off transistors 84 and 39. As a result, current flows now through resistors 85, 78 and 80 and transistors 66 and 71 are rendered conducting. Further, since transistor 39 is cut off the resistors connected in parallel with the resistor 36 are rendered ineffective. Therefore, the base current of transistor 31 is increased and the constant collector current of this transistor is changed to its higher level. That is to say, the first reference setting $-\alpha p$ is changed to its higher level. Further, since resistors 65 and 70 are connected in parallel with resistors 64 and 69, respectively, the inputs applied to the input terminal (+) of comparator 62 and to the input terminal (−) of comparator 67 are reduced. The input applied to the input terminal (+) of comparator 62 represents the second reference setting $-G_o$ and the input applied to the input terminal (−) of comparator 62 represents the wheel acceleration $r\dot{\omega}$. Thus, the second reference setting $-G_o$ is changed to its higher, or less positive, level when the input applied to the input terminal (+) of comparator 62 is reduced. Similarly, the third reference setting G is changed to its lower level when the input applied to the input terminal (−) of comparator 67 is reduced.

It will be appreciated from the foregoing detailed description that the present invention provides an improved antiskid system in which brake fluid pressure relieving, maintaining and increasing instructions are selectively produced depending on the road surface conditions and vehicle body speed. The system ensures reliable anti-skid effects including elimination of undesirable skidding, reduction of the distance required for stopping the vehicle and elimination of undesirable irregular gyration of the vehicle body, thereby contributing to safer and smoother stopping of the vehicle. Further, the present invention is economical and practical since no complex circuits are required.

What is claimed is:

1. An anti-skid system for vehicles comprising means for detecting the rotating speed of a wheel, means for generating an approximate vehicle body speed pattern signal when the rate of reduction of the wheel speed responsive output of said wheel speed detecting means reaches the level of a first reference setting due to the application of the brake, first comparing means for comparing the wheel speed responsive output of said wheel speed detecting means with the approximate vehicle body speed pattern signal thereby generating a first control signal depending on the relation therebetween, means for differentiating the wheel speed responsive output of said wheel speed detecting means thereby producing a signal representative of the wheel acceleration, second comparing means for comparing the output of said differentiating means with a second reference setting representative of a predetermined deceleration thereby generating a second control signal depending on the relation therebetween, third comparing means for comparing the output of said differentiating means with a third reference setting representative of a predetermined acceleration thereby generating a third control signal depending on the relation therebetween, and switch means responsive to vehicle body deceleration for setting said first, second and third settings to one of two levels depending on the road surface condition, said first and third comparing means being connected through an AND gate to the solenoid of a solenoid operated valve in a modulator, said first and second comparing means being connected through another AND gate to the solenoid of another solenoid operated valve in said modulator so as to selectively energize and de-energize the solenoids of said solenoid operated valves thereby relieving, maintaining and increasing the brake fluid pressure.

2. An anti-skid system as claimed in claim 1, wherein said first and second reference settings are set to a higher level and said third reference setting is set to a lower level when the vehicle runs on a high friction road surface, while said first and second reference settings are set to a lower level and said third reference setting is set to a higher level when the vehicle runs on a low friction road surface.

3. Apparatus as claimed in claim 1 wherein said means for obtaining said first control signal includes means for comparing the rate of decrease of wheel speed to a predetermined rate of decrease and for generating a signal representing said approximate vehicle body speed when said rate of decrease of wheel speed equals said predetermined rate.

4. Apparatus according to claim 1 wherein the approximate vehicle body speed pattern signal, when initiated, is equal to the wheel speed responsive output of the wheel speed detecting means and thereafter said pattern signal is reduced at a predetermined constant rate.

* * * * *

UNITED STATES PATENT OFFICE
CERTIFICATE OF CORRECTION

Patent No. 3,861,756      Dated January 21, 1975

Inventor(s) Tetsuro Arikawa

It is certified that error appears in the above-identified patent and that said Letters Patent are hereby corrected as shown below:

In the Abstract, line 7, correct the spelling of --differentiating--.
Column 4, line 10, correct the spelling of --which--.
Column 5, line 47, after switch, change "17" to --27--.
" line 51, correct the formula to read -- $-\dot{V}_o$ $(-\dot{V}_o > 0)$ --.
" line 55, after switch, change "17" to --27--.
Column 6, line 9, change "-p" to -- $-\measuredangle p$ --.
Column 8, line 32, change "Rω" to --nω--.

Signed and sealed this 8th day of April 1975.

(SEAL)
Attest:

RUTH C. MASON      C. MARSHALL DANN
Attesting Officer      Commissioner of Patents and Trademarks